US008321678B2

(12) United States Patent
Hofmann et al.

(10) Patent No.: US 8,321,678 B2
(45) Date of Patent: Nov. 27, 2012

(54) SYSTEM AND METHOD TO SEND A MESSAGE USING MULTIPLE AUTHENTICATION MECHANISMS

(75) Inventors: Christoph H. Hofmann, Wiesloch (DE); Martijn De Boer, Heidelberg (DE)

(73) Assignee: SAP AG, Walldorf (DE)

( * ) Notice: Subject to any disclaimer, the term of this patent is extended or adjusted under 35 U.S.C. 154(b) by 963 days.

(21) Appl. No.: 11/582,105

(22) Filed: Oct. 17, 2006

(65) Prior Publication Data

US 2008/0091950 A1 Apr. 17, 2008

(51) Int. Cl.
*H04L 9/32* (2006.01)

(52) U.S. Cl. ........ 713/176; 713/161; 713/168; 713/170; 726/4; 726/5; 726/6; 726/17; 726/26

(58) Field of Classification Search ........................ None
See application file for complete search history.

(56) References Cited

U.S. PATENT DOCUMENTS 6,092,191 A 7/2000 Shimbo et al.
6,148,404 A 11/2000 Yatsukawa
6,243,466 B1 6/2001 Young et al.
7,043,760 B2 5/2006 Holtzman et al.
7,120,692 B2 10/2006 Hesselink et al.
7,296,290 B2 11/2007 Barriga et al.
7,526,799 B2 * 4/2009 Birk et al. ........................ 726/9
2002/0087862 A1 7/2002 Jain et al.
2003/0046551 A1 * 3/2003 Brennan ........................ 713/185
2003/0163733 A1 8/2003 Barriga-Caceres et al.
2004/0059942 A1 3/2004 Xie
2004/0133499 A1 7/2004 Mitreuter et al.
2004/0181665 A1 * 9/2004 Houser ........................ 713/158
2005/0235153 A1 * 10/2005 Ikeda ........................ 713/176
2005/0278528 A1 12/2005 Kathan
2007/0113089 A1 5/2007 Yami et al.
2007/0248050 A1 10/2007 Metke et al.
2008/0091948 A1 4/2008 Hofmann et al.
2008/0091949 A1 4/2008 Hofmann et al.

OTHER PUBLICATIONS

"Security Assertion Markup Language (SAML) 2.0 Technical Overview", OASIS, 2005, pp. 1-40.*
"Advisory Action" mailed Jul. 28, 2010, for U.S. Appl. No. 11/582,036, entitled "Propagation of Principal Authentication Data in a Mediated Communication Scenario", filed Oct. 17, 2006, 3pgs.
"Advisory Action" mailed Nov. 17, 2010, for U.S. Appl. No. 11/582,066, entitled "Propagation of Authentication Data in an Intermediary Service Component" filed Oct. 17, 2006, 3pgs.
"Non-Final Office Action" mailed Jun. 27, 2011, for U.S. Appl. No. 11/582,036, entitled "Propagation of Principal Authentication Data in a Mediated Communication Scenario", filed Oct. 17, 2006, 19pgs.

(Continued)

*Primary Examiner* — Sheway Gelagay
(74) *Attorney, Agent, or Firm* — Buckley, Maschoff & Talwalkar LLC

(57) ABSTRACT

A system may include a sender computing system to transmit first authentication data in association with a message, the first authentication data conforming to a first authentication mechanism, and to transmit second authentication data in association with the message, the second authentication data conforming to a second authentication mechanism. The system may also include a component to receive the first authentication data in association with the message from the sender computing system, and to receive the second authentication data in association with the message from the sender computing system.

18 Claims, 4 Drawing Sheets

400

S410: RECEIVE A MESSAGE INCLUDING FIRST AUTHENTICATION DATA ASSOCIATED WITH AN ATTESTER CERTIFICATE, AND INCLUDING SECOND AUTHENTICATION DATA CONFORMING TO A SECOND AUTHENTICATION MECHANISM

S420: PERFORM AUTHENTICATION ACTION OF THE SECOND AUTHENTICATION DATA BASED ON THE SECOND AUTHENTICATION MECHANISM

S430: PROCESS THE MESSAGE

S440: TRANSMIT PROCESSED MESSAGE AND FIRST AUTHENTICATION DATA TO A RECEIVER COMPUTING SYSTEM

OTHER PUBLICATIONS

"Non-Final Office Action" mailed Aug. 17, 2011, for U.S. Appl. No. 11/582,066, entitled "Propagation of Authentication Data in an Intermediary Service Component" filed Oct. 17, 2006,14pgs.

"Final Office Action" mailed Dec. 9, 2011, for U.S. Appl. No. 11/582,036, entitled "Propagation of Principal Authentication Data in a Mediated Communication Scenario", filed Oct. 17, 2006, 15pgs.

"Non-Final Office Action" mailed Dec. 15, 2009, for U.S. Appl. No. 11/582,066, entitled "Propagation of Authentication Data in an Intermediary Service Component", filed Oct. 17, 2006, 17pgs.

"Non-Final Office Action" mailed Dec. 16, 2009, for U.S. Appl. No. 11/582,036, entitled "Propagation of Principal Authentication Data in a Mediated Communication Scenario", filed Oct. 17, 2006, 16pgs.

"Non-Final Office Action" mailed Apr. 13, 2010, for U.S. Appl. No. 11/582,066, entitled "Propagation of Authentication Data in an Intermediary Service Component" filed Oct. 17, 2006,13pgs.

"Final Office Action" mailed May 26, 2010, for U.S. Appl. No. 11/582,036, entitled "Propagation of Authentication Data in a Mediated Communication Scenario" filed Oct. 17, 2006,12pgs.

"Final Office Action" mailed Aug. 31, 2010, for U.S. Appl. No. 11/582,066, entitled "Propagation of Authentication Data in an Intermediary Service Component" filed Oct. 17, 2006,15pgs.

* cited by examiner 300
310
Application (User U1)
Interface Adapter
Certificate Handling
312
314
316
350
Message
U2 Auth. Data352
Certificate <U1 Auth. Data>
354
320
321
Interface Adapter
Certificate Handling
324
322
Message Pipeline
323
Interface Adapter
Certificate Handling
325
360
Message
Certificate <U1 Auth. Data>
364
330
Application
Interface Adapter
Certificate Handling
332
334
336

SYSTEM AND METHOD TO SEND A MESSAGE USING MULTIPLE AUTHENTICATION MECHANISMS

FIELD

Some embodiments relate to sending messages between a sender computing system and a receiver computing system. In particular, some embodiments concern secure transmission of messages from the sender computing system to the receiver computing system using two or more authentication mechanisms.

BACKGROUND

A sender computing system may execute an application that desires a service provided by a receiver computing system. The application may therefore transmit an electronic message to the receiver, the message including service data on which the service is to be provided as well as authentication data identifying a user. The receiver uses the authentication data to perform an authentication action for logging the user into the receiver system. If the authentication action is successful, the receiver executes code under the user to implement the service on the service data.

The above-mentioned application is executed under a user of the sender computing system. The authentication data sent from the sender to the receiver may identify this actual user, or may comprise fixed authentication data that are statically configured and identify a fixed user in the receiver. In the former case, the receiver must be aware of the identity of the actual user in order for the authentication action to be successful.

Conventional communication protocols do not provide sufficiently flexible authentication in certain situations. Systems are therefore desired for improved authentication between a sender computing system and a receiver computing system.

DETAILED DESCRIPTION

Figure 1:
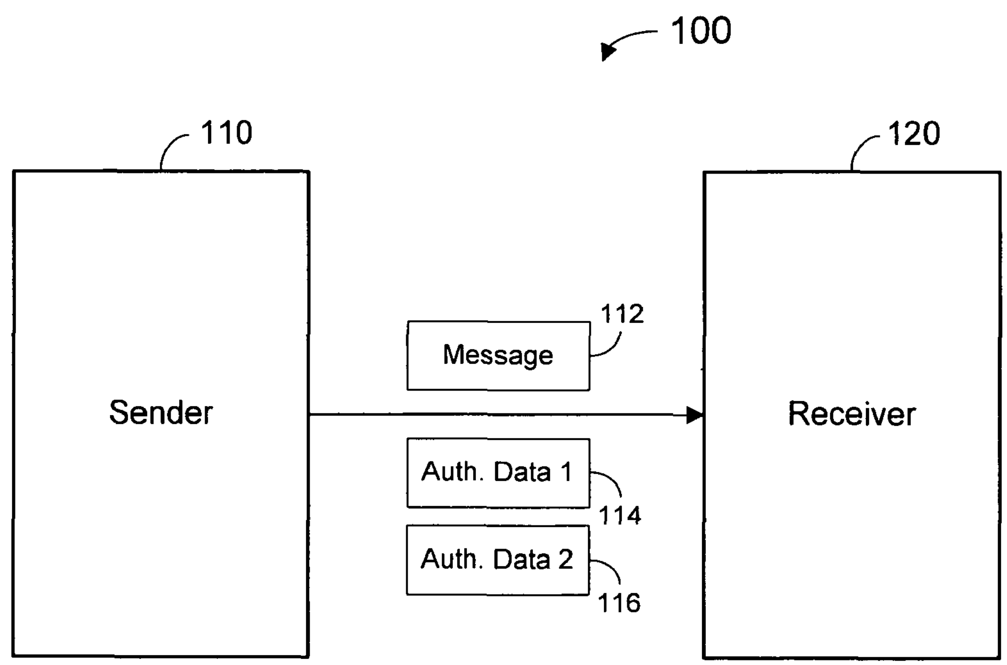
FIG. 1 is a block diagram of a system according to some embodiments.

FIG. 1 is a block diagram of system 100 according to some embodiments. System 100 illustrates a communication scenario in which sender 110 communicates with receiver 120. Other topologies may be used in conjunction with other embodiments.

The elements of system 100 may be located remote from one another and may communicate with one another via a network and/or a dedicated connection. Moreover, each displayed element of system 100 may comprise any number of hardware and/or software elements suitable to provide the functions described herein, some of which are located remote from each other.

According to some embodiments, sender 110 may comprise a sender application that requires a service from receiver

120, which in turn comprises a receiver application. Sender 110 transmits message 112 to receiver 120 as shown, and also transmits authentication data 114 and authentication data 116 in association with message 112. One or both of authentication data 114 and authentication data 116 may be separate from or included within message 112 according to some embodiments.

Authentication data 114 and authentication data 116 may comprise any data based on which receiver 120 may perform an authentication action. In some embodiments, receiver 120 performs an authentication action based on one or both of authentication data 114 and authentication data 116.

One or both of authentication data 114 and authentication data 116, in some embodiments, may identify a principal user under whom sender 110 is executing. Authentication data 114 or authentication data 116 may therefore be used to login the principal user to receiver 120. One or both of authentication data 114 and authentication data 116 may be associated with a fixed anonymous user known to receiver 120 and to sender 110. In such a case, receiver 120 might not be required to have any knowledge of the principal user.

Authentication data 114 conforms to a first authentication mechanism, and authentication data 116 conforms to a second authentication mechanism. Non-exhaustive examples of authentication mechanisms to which authentication data 114 and authentication data 116 may conform include a username/password authentication mechanism (e.g., basic mode or digest mode), an X.509 certificate authentication mechanism, an SAP® logon ticket, and a Security Assertion Markup Language (SAML) assertion. Authentication data 114 and 116 may also or alternatively conform to any other currently- or hereafter-known authentication mechanisms.

According to the username/password authentication mechanism, the username and password of a user are maintained in sender 110. According to the basic mode, sender 110 directly sends the username and password to receiver 120 for authentication and for directly logging into receiver 120. According to the digest mode, a digest (e.g., a one-way hash value) of the stored username and password is sent to receiver 120 for authentication. The digest may be sent with a nonce for avoiding replay attacks.

The X.509 certificate authentication mechanism requires sender 110 to create a signature using a private key and to transmit the signature together with an X.509 certificate containing an associated public key to receiver 120. Accordingly, the user's private key and certificate are maintained in sender 110. As a consequence of the X.509 certificate authentication mechanism, the integrity of the signed message contents is guaranteed.

Sender 110 may also create an SAP-logon ticket for the principal user. The SAP-logon ticket includes a SAP-specific assertion containing the name of the principal user. The assertion is signed by a private key of sender 110.

A SAML assertion includes the name of the principal user and is signed by a trusted attester system against which sender 110 is able to authenticate the subject. The SAML assertion also contains a signature with respect to message 112 in order to associate the assertion to the message contents. SAML assertions include "holder-of-key" assertions in which sender 110 sends a SAML-enriched message to receiver 120 or "sender vouches" assertions in which the aforementioned attester forwards the message to the receiver 120.

Authentication data 114 and authentication data 116 may be transmitted on the transport level (e.g., sent via Hypertext Transfer Protocol communication mechanisms), the message level (e.g., within Simple Object Access Protocol message 112), or in any other suitable manner. According to some embodiments, sender 110 and/or receiver 120 comprises an Advanced Business Application Programming® (ABAP) business system that employs ABAP proxies to communicate via a common protocol. In other embodiments, sender 110 and/or receiver 120 comprises a Java™ proxy executed by an SAP Adapter Engine™ to transmit/receive messages via the common protocol.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
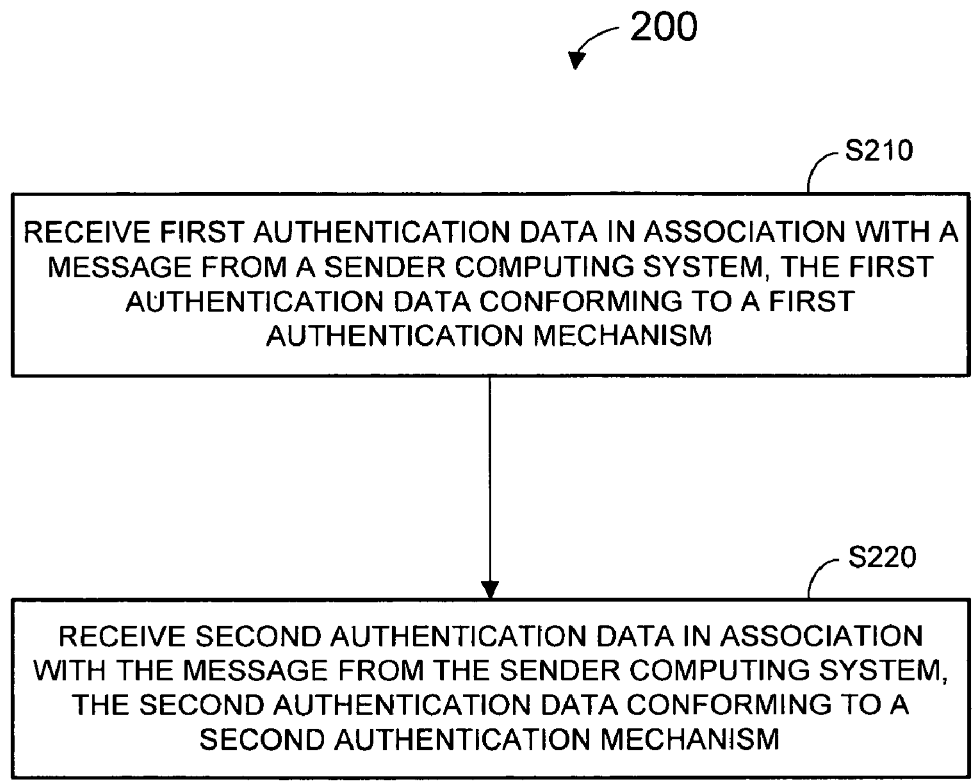
FIG. 2 is a flow diagram of a process according to some embodiments.

FIG. 2 is a flow diagram of process 200 according to some embodiments. Some embodiments of process 200 may provide transmission of a message using multiple authentication mechanisms. In some embodiments, receiver 120 executes program code to perform process 200.

Process 200 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, first authentication data is received from a sender computing system in association with a message. The first authentication data conforms to a first authentication mechanism. In this regard, the first authentication mechanism may be used to perform an authentication action based on the first authentication data.

Second authentication data is then received from the sender computing system in association with the message. The second authentication data conforms to a second authentication mechanism. The second authentication mechanism may differ in any degree from the first authentication mechanism.

The first authentication mechanism and the second authentication mechanism may comprise any authentication mechanisms that are or become known. One or both of the first authentication data and the second authentication data may identify a principal user of the sender computing system. One or both of the first authentication data and the second authentication data may be associated with a fixed anonymous user known to the receiver and to the sender computing system.

The first authentication data and the second authentication data may be associated with the message in any manner that is or becomes known, and may be received via any transport protocol that is or becomes known. The first authentication data and the second authentication data may be included within the message or may be separate from the message. The message, the first authentication data and the second authentication data may be received simultaneously according to some embodiments of process 200.

Figure 3:
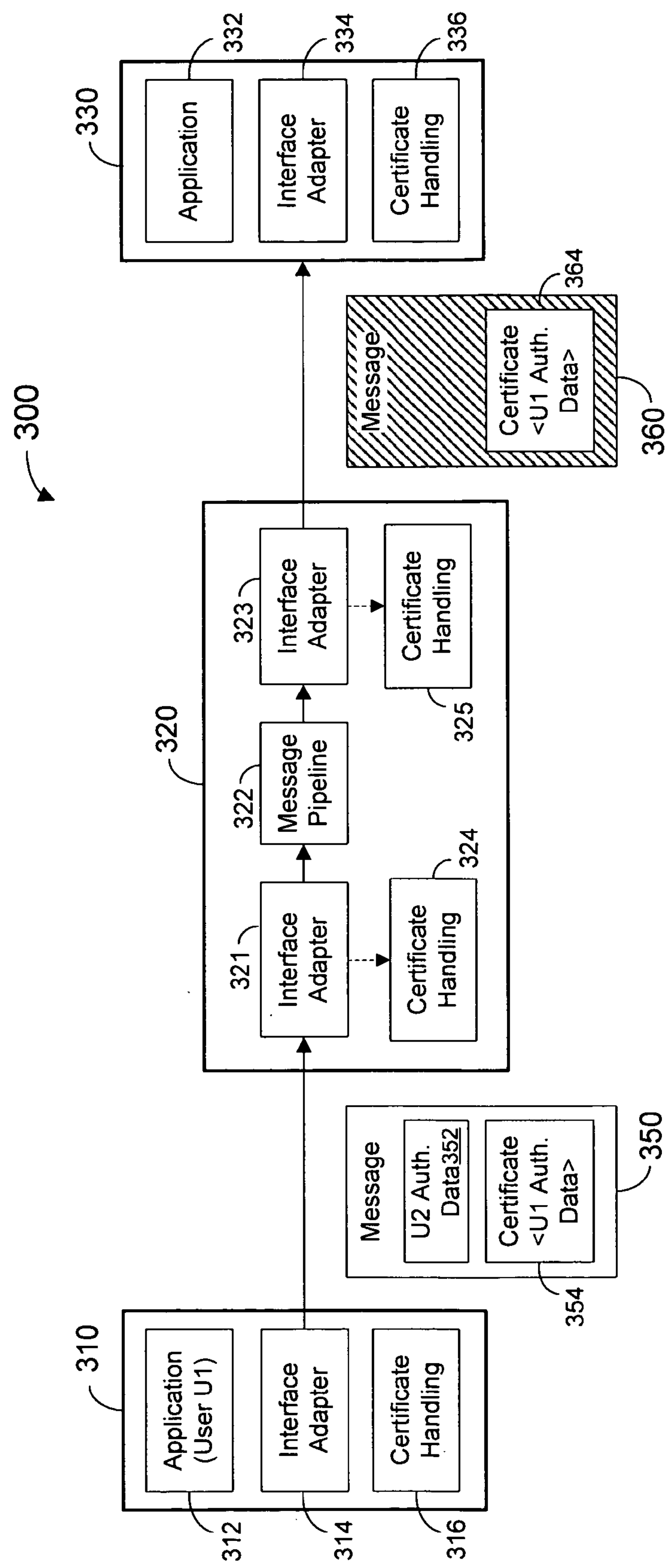
FIG. 3 is a block diagram of a system to send a message using multiple authentication mechanisms according to some embodiments.

FIG. 3 is a detailed block diagram of system 300 according to some embodiments. System 300 may comprise an implementation of system 100 of FIG. 1. Accordingly, system 300 may execute process 200 in some embodiments.

System 300 includes sender computing system 310, intermediary component 320 and receiver computing system 330. Sender computing system 310 and intermediary component 320 may operate as described above with respect to elements 110 and 120. A detailed operation of system 300 according to some embodiments will be described below with respect to FIG. 4.

Sender computing system 310 includes application 312, interface adapter 314 and certificate handling 316. Application 312 may comprise an application desiring service from receiver computing system 330, and interface adapter 314 may provide communication via a protocol that is supported by intermediary component 320. Certificate handling 316 may provide system 310 with the ability to secure messages using attester signatures and attester certificates. System 310 may comprise any system capable of executing program code. In this regard, the illustrated elements of system 310 may represent program code providing the particular functions described above.

As shown, interface adapter 314 may transmit message 350 to intermediary component 320. Message 350 includes authentication data 352 and assertion 354. Authentication data 352 may be associated with an actual or fixed anonymous user (U2) known to component 320. Assertion 354 may include an attester signature of message 350 (i.e., including assertion 354) and an attester certificate and authentication data associated with principal user U1, under whom application 312 is executed.

Interface adapter 321 of intermediary component 320 is to receive message 350 from system 310, message pipeline 322 is to apply any required processing to message 350, and interface adapter 323 is to transmit processed message 360 including assertion 364 to receiver computing system 330. According to some embodiments, intermediary component 320 may be implemented by an integration server such as an SAP Exchange Infrastructure™ integration server.

Intermediary component 320 also includes certificate handling block 324 and certificate handling block 325. Generally, block 324 performs an authentication action based on received assertion 354. The authentication action may comprise a validity check of assertion 354 that evaluates the attester's signature and the trustworthiness of the attester certificate based on a trusted relationship with the attester. Block 325 operates to create a second assertion including the authentication data associated with principal user U1, a second attester signature of message 360 and a second attester certificate. Second assertion 364 is included in message 360 prior to transmission to system 330.

Receiver computing system 330 includes application 332, interface adapter 334 and certificate handling 336. Application 332 may be capable of providing the service required by application 312 of sender computing system 310, and interface adapter 334 may support communication with interface adapter 323 of intermediary component 320. Certificate handling 336 may perform an authentication action based on second assertion 364 and on a trusted relationship with an attester associated with block 325. If the action is successful, the authentication data associated with principal user U1 may be used to login to receiver 330 and to execute application 332 under principal user U1 so as to provide the requested service.

Figure 4:
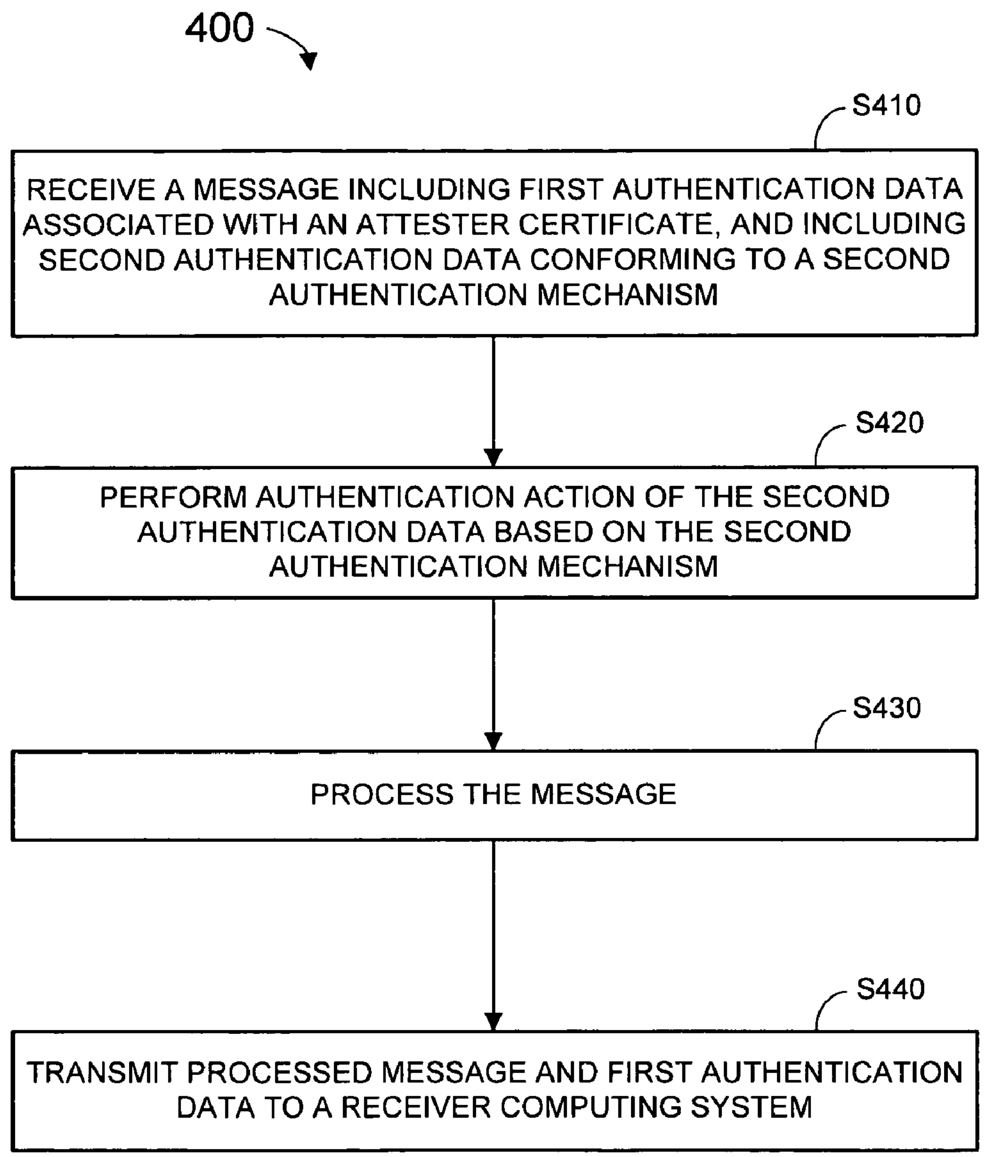
FIG. 4 is a flow diagram of a process executed by the FIG. 3 system according to some embodiments.

FIG. 4 comprises a flow diagram of process 400 according to some embodiments. In some embodiments, intermediary component 320 of FIG. 3 executes program code to perform process 400.

According to process 400, a message is received from a sender computing system at S410. The message includes an assertion and second authentication data. The assertion includes first authentication data, an attester signature of the message, including the assertion, and an attester certificate. The first authentication data is associated with a first authentication mechanism and the second authentication data is associated with a second authentication mechanism. With reference to the example of FIG. 3, interface adapter 321 of intermediary component 320 may receive message 350 from interface adapter 314 at S410.

More specifically, application 312, executing under user U1, may use interface adapter 314 to call a proxy object of executable interfaces for communicating with component 320. The proxy object may create message 350 including authentication data 352 associated with an actual or fixed anonymous user (U2) known to component 320 and to sender 310. The proxy object may also interact with certificate handling 316 to obtain a certificate and to include associated assertion 354 in message 350. As described above, assertion 354 includes an attester signature of message 350, an attester certificate and authentication data associated with principal user U1. According to some embodiments, the proxy object and interface adapter 314 also operate to transmit message 350 via the Web Services protocol.

Next, at S420, an authentication action is performed based on the second authentication data. The authentication action may be performed based on the second authentication mechanism that is associated with the received second authentication data. For example, in a case that the second authentication data (e.g., U2 authentication data) comprises a username/password, the authentication action performed at S420 may comprise checking the username/password against a stored username/password. In the case of a digest mode username/password mechanism, component 420 re-creates the hash value prior to checking the username/password.

Performance of the authentication action may comprise checking if a received certificate is trusted in a case that the second authentication mechanism comprises an X.509 certificate-based mechanism. Such a mechanism may require configuration or implementation of a mapping from the certificate to an actual user. An SAP logon ticket mechanism and an SAML assertion-based mechanism also require an established trust relationship between the ticket creator and component 320. Moreover, the SAML assertion-based mechanism utilizes a mapping of the principal name to an actual user.

The received message is processed at S430. The message may be processed in any manner. In some embodiments of S430, intermediary component 320 may process message 350 in order to provide messaging-related services to sender 310 and receiver 330. Such services may include message processing at the transport level, message processing at the message level, and/or any other desired message processing. Intermediary component 320 may provide dynamic routing of messages received from sender 310 and/or mapping of message contents based on different message formats supported by sender 310 and receiver 330.

The processed message and the first authentication data are transmitted to a receiver computing system at S440. Again with reference to FIG. 3, processed message 360 including second assertion 364 may be transmitted to receiver 330 at S440. Second assertion 364 may include the first authentication data, a second attester signature of message 360, and a second attester certificate created by certificate handling block 325.

According to some embodiments, interface adapter 334 receives message 360 from interface adapter 323 of intermediary component 320 and certificate handling 336 performs an authentication action based on second assertion 364 and on a trusted relationship with the attester associated with block 325. After successful authentication, application 332 executes under principal user U1 to provide the requested service.

The embodiments described herein are solely for the purpose of illustration. Those skilled in the art will recognize other embodiments may be practiced with modifications and alterations limited only by the claims.

What is claimed is:

1. A method comprising:

receiving, by a component that executes program code, first authentication data in association with a message from a sender computing system, the first authentication data conforming to a first authentication mechanism and being associated with a user in the sender computing system;

receiving, by the component, second authentication data in association with the message from the sender computing system, the second authentication data conforming to a second authentication mechanism and being associated with a fixed anonymous user that is different than the user associated with the first authentication data;

wherein the message includes the second authentication data and an assertion that includes the first authentication data, an attester signature of the message, and an attester certificate;

performing, by the component, an authentication action of the second authentication data based on the second authentication mechanism;

determining, by the component, whether the attester signature is valid and whether the attester certificate is trusted;

processing the message after the receiving, by the component, of the first authentication data in association with the message from the sender computing system;

wherein the processed message comprises a second assertion including the first authentication data, a second attester signature and a second attester certificate created by a certificate handling block of the component;

transmitting the processed message that comprises the second assertion including the first authentication data, the second attester signature and the second attester certificate created by the certificate handling block of the component to a receiver computing system; and after the receiving, by the component, the first authentication data in association with the message from the sender computing system, not performing an authentication action based on the first authentication data until after the transmission of the processed message that comprises the second assertion including the first authentication data, the second attester signature and the second attester certificate created by the certificate handling block of the component to a receiver computing system.

2. A method according to claim 1, wherein the transmitting the processed message comprising the second assertion including the first authentication data, the second attester signature and the second attester certificate created by the certificate handling block of the component to a receiver computing system comprises:

transmitting the processed message comprising the second assertion including the first authentication data, the second attester signature and the second attester certificate created by the certificate handling block of the component to a receiver computing system that is to perform an authentication action based on the second assertion and a trusted relationship with an attester associated with the certificate handling block of the component.

3. A method according to claim 2, wherein the component performs the processing of the message.

4. A method according to claim 1, wherein the transmitting the processed message comprising the second assertion including the first authentication data, the second attester signature and the second attester certificate created by the certificate handling block of the component to a receiver computing system comprises:

transmitting, by the component, the processed message comprising the second assertion including the first authentication data, the second attester signature and the second attester certificate created by the certificate handling block of the component to a receiver computing system.

5. A method according to claim 1, wherein the transmitting the processed message comprising the second assertion including the first authentication data, the second attester signature and the second attester certificate created by the certificate handling block of the component to a receiver computing system comprises:

transmitting, by the component, the processed message comprising the second assertion including the first authentication data, the second attester signature and the second attester certificate created by the certificate handling block of the component to a receiver computing system that is to perform an authentication action based on the second assertion and a trusted relationship with an attester associated with the certificate handling block of the component.

6. A method according to claim 5, wherein the component performs the processing of the message.

7. A method according to claim 1, wherein the component performs the processing of the message.

8. A non-transitory computer-readable medium storing processor-executable program code, the program code comprising:

code to receive, by a component, first authentication data in association with a message from a sender computing system, the first authentication data conforming to a first authentication mechanism and being associated with a user in the sender computing system; and code to receive, by the component, second authentication data in association with the message from the sender computing system, the second authentication data conforming to a second authentication mechanism and being associated with a fixed anonymous user that is different than the user associated with the first authentication data;

wherein the message includes the second authentication data and an assertion that includes the first authentication data, an attester signature of the message, and an attester certificate;

code to perform, by the component, an authentication action of the second authentication data based on the second authentication mechanism;

code to determine, by the component, whether the attester signature is valid and whether the attester certificate is trusted;

code to perform, by the component, processing of the message after reception, by the component, of the first authentication data in association with the message;

wherein the processed message comprises a second assertion including the first authentication data, a second attester signature and a second attester certificate created by a certificate handling block of the component; and code to transmit the processed message that comprises the second assertion including the first authentication data, the second attester signature and the second attester certificate created by the certificate handling block of the component to a receiver computing system without first performing, by the component, an authentication action based on the received first authentication data.

9. A non-transitory computer-readable medium according to claim 8, the program code not including code to perform an authentication action based on the first authentication data.

10. A non-transitory computer-readable medium according to claim 8, wherein the code to transmit the processed message that comprises the second assertion including the first authentication data, the second attester signature and the second attester certificate created by the certificate handling block of the component to a receiver computing system comprises:

code to transmit the processed message that comprises the second assertion including the first authentication data, the second attester signature and the second attester certificate created by the certificate handling block of the component to a receiver computing system that is to perform an authentication action based on the second assertion and a trusted relationship with an attester associated with the certificate handling block of the component.

11. A non-transitory computer-readable medium according to claim 8, wherein the code to transmit the processed message that comprises the second assertion including the first authentication data, the second attester signature and the second attester certificate created by the certificate handling block of the component to a receiver computing system comprises:

code to transmit, by the component, the processed message that comprises the second assertion including the first authentication data, the second attester signature and the second attester certificate created by the certificate handling block of the component to a receiver computing system.

12. A non-transitory computer-readable medium according to claim 8, wherein the code to transmit the processed message that comprises the second assertion including the first authentication data, the second attester signature and the second attester certificate created by the certificate handling block of the component to a receiver computing system comprises:

code to transmit, by the component, the processed message that comprises the second assertion including the first authentication data, the second attester signature and the second attester certificate created by the certificate handling block of the component to a receiver computing system that is to perform an authentication action based on the second assertion and a trusted relationship with an attester associated with the certificate handling block of the component.

13. A non-transitory computer-readable medium according to claim 12, the program code not including code to perform an authentication action based on the first authentication data.

14. A non-transitory computer-readable medium according to claim 8, the program code not including code to perform, by the component, an authentication action based on the first authentication data.

15. A system comprising:

a sender computing system that includes hardware and is to transmit first authentication data in association with a message, the first authentication data conforming to a first authentication mechanism and being associated with a user in the sender computing system, and to transmit second authentication data in association with the message, the second authentication data conforming to a second authentication mechanism and being associated with a fixed anonymous user that is different than the user associated with the first authentication data; and a component that includes hardware and is to receive the first authentication data in association with the message from the sender computing system, to receive the second authentication data in association with the message from the sender computing system, wherein the message includes the second authentication data and an assertion that includes the first authentication data, an attester signature of the message, and an attester certificate, to perform an authentication action of the second authentication data based on the second authentication mechanism, to determine whether the attester signature is valid and whether the attester certificate is trusted, process the message after reception, by the component, of the first authentication data in association with the message, wherein the processed message comprises a second assertion including the first authentication data, a second attester signature and a second attester certificate created by a certificate handling block of the component, and to transmit the processed message that comprises the second assertion including the first authentication data, the second attester signature and the second attester certificate created by the certificate handling block of the component to a receiver computing system without first performing, by the component, an authentication action based on the received first authentication data.

16. A system according to claim 15, the component not to perform an authentication action based on the first authentication data.

17. A system according to claim 15, wherein transmission of the processed message that comprises the second assertion including the first authentication data, the second attester signature and the second attester certificate created by the certificate handling block of the component to a receiver computing system comprises:

transmission of the processed message that comprises the second assertion including the first authentication data, the second attester signature and the second attester certificate created by the certificate handling block of the component to a receiver computing system that is to perform an authentication action based on the second assertion and a trusted relationship with an attester associated with the certificate handling block of the component.

18. A system according to claim 17, wherein the component is not to perform an authentication action based on the first authentication data.

* * * * *